United States Patent
Rehman et al.

(10) Patent No.: US 8,180,888 B2
(45) Date of Patent: May 15, 2012

(54) NETWORK MASS OPERATION INFRASTRUCTURE

(75) Inventors: Samuelson Rehman, San Francisco, CA (US); Gregory Grisco, San Diego, CA (US); Anit Chakroborty, New York, NY (US); Prabhat Dalmia, Foster City, CA (US); Jun Mao, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 313 days.

(21) Appl. No.: 12/346,648

(22) Filed: Dec. 30, 2008

(65) Prior Publication Data

US 2009/0177774 A1     Jul. 9, 2009

Related U.S. Application Data

(60) Provisional application No. 61/018,629, filed on Jan. 2, 2008.

(51) Int. Cl.
*G06F 15/173*   (2006.01)

(52) U.S. Cl. ......... 709/224; 709/220; 709/225; 713/153

(58) Field of Classification Search ............... 709/220, 709/224, 225; 713/153
See application file for complete search history.

(56) References Cited

U.S. PATENT DOCUMENTS

| | | | |
|---|---|---|---|
| 7,739,396 B2 * | 6/2010 | Adams et al. ............ 709/230 |
| 7,769,848 B2 * | 8/2010 | Choy et al. ............. 709/224 |
| 7,860,968 B2 * | 12/2010 | Bornhoevd et al. ......... 709/224 |
| 8,041,834 B2 * | 10/2011 | Ferri et al. ............ 709/238 |
| 2003/0225782 A1 * | 12/2003 | MucFaden et al. ........ 707/102 |
| 2005/0116822 A1 * | 6/2005 | Wang et al. ............ 340/539.13 |
| 2005/0198228 A1 * | 9/2005 | Bajwa et al. ............ 709/220 |
| 2006/0143439 A1 * | 6/2006 | Arumugam et al. ........ 713/153 |
| 2007/0027966 A1 * | 2/2007 | Singhal et al. ........... 709/220 |
| 2008/0052757 A1 * | 2/2008 | Gulati et al. ............. 726/1 |

* cited by examiner

*Primary Examiner* — Thomas Dailey
(74) *Attorney, Agent, or Firm* — Kilpatrick Townsend & Stockton LLP

(57) ABSTRACT

In various embodiments, a method for managing edge processors includes providing an interface that allows a user to define a network operation associated with a edge processor. A network operation is generated based on input received via the interface. An action defined by the network operation is then performed at one or more edge processors.

18 Claims, 14 Drawing Sheets

NETWORK MASS OPERATION INFRASTRUCTURE

CROSS-REFERENCE TO RELATED APPLICATIONS

This application claims priority to and the benefit of U.S. Provisional Patent Application No. 61/018,629, filed Jan. 2, 2008 and entitled "Hierarchical Network Management and Operations of Edge Processors," the entire disclosure of which is herein incorporated by reference for all purposes.

BACKGROUND OF THE INVENTION

Embodiments of the present invention generally relate to information systems. More specifically, embodiments of the present invention relate to techniques for management of real-time edge processors.

Radio Frequency Identification (RFID) is an automatic identification method which relies on the storing and remotely retrieving of data using devices, such as RFID tags or transponders. RFID tags or transponders are also known as proximity, proxy, or contactless cards, because data from an RFID tag can be retrieved without physical contact. Generally, a device, such as an RFID reader, uses radio waves to remotely retrieve a unique identifier stored using the RFID tag when the RFID tag is within proximity of the RFID reader. RFID tags can be attached to or incorporated into a product, animal, or person for the purpose of identification by the RFID reader. RFID readers can be placed on doorways, in train cars, over freeways, mounted on vehicles, and also can be embodied in mobile handheld devices.

RFID technologies have been traditionally implemented in different ways by different manufacturers, although global standards are being developed. Thus, computer applications using RFID are also typically hard-coded to specific RFID devices sold by the same manufacture. One problem with this arrangement is that these computer applications have traditionally been limited to using only the sensor data retrieved from the vendor supplied RFID readers.

Typically, a device called an edge processor handles real-time tasks associated with tracking objects, such as using RFID. The edge processor can be hosted on a PC sitting in front of automation equipment, or in an embedded host in front of RFID or other sensors. Unfortunately, there is no standard way to manage these devices.

Accordingly, what is desired are improved methods and apparatus for solving the problems discussed above, while reducing the drawbacks discussed above.

BRIEF SUMMARY OF THE INVENTION

Embodiments of the present invention generally relate to information systems. More specifically, embodiments of the present invention relate to techniques for management of realtime edge processors.

In general, a hierarchical network infrastructure is disclosed to management one or more edge processing nodes. The network infrastructure can provide relaying of telemetry information, managing the host or node itself, and the software running on it, and allowing the information to be trickled up the chain. In various embodiments, the network infrastructure provides each sub tree of the network to have different access control for local administrators.

In various embodiments, a method for managing edge processors includes providing an interface that allows a user to define a management hierarchy between a plurality of edge processors. Input is received via the interface designating a management node and a first set of relationships between the management mode and at least one edge processor. A management hierarchy is generated between the management node and the at least one edge processor based on the first set of relationships.

In some embodiments, sensor data is received collected from one or more physical devices at the at least one edge processor. The sensor data is then transmitted to the management node based on the management hierarchy. Messages, instructions, and/or management information may be received at the management node designated for the at least one edge processor. The messages, instructions, and/or management information are transmitted to the at least one edge processor based on the management hierarchy.

In further embodiments, an instruction is received at the management node to perform an operation. The management node may then perform the operation. The management node may further instruct the at least one edge processor to perform the operation. Information may be received at the management node indicative of the status of the operation.

In various embodiments, one or more sensor devices, one or more edge processors, or one or more nodes may be identified as a virtual node in the management hierarchy. The collection of devices, processors, or nodes may be treated as a single entity in the management hierarchy. Input may be received via the interface identifying a virtual node as a set of edge processors. The management hierarchy may be updated to include the virtual node based on a second set of relationships between the management node and the virtual node.

In still further embodiments, a policy is received at the management node. The policy may then be enforced at the edge processor. The policy may be a corporate policy, business policy, regulation, security protocol, and the like. The policy may include access control information. Enforcing the policy at the edge processor may include allowing or disallowing performance of an operation at the edge processes based on the access control information.

In one embodiment, a system for managing edge processor includes an interface, a processor, an memory. The interface is configured to allow a user to define a management hierarchy between a plurality of edge processors. The memory is coupled to the processor and configured to store a set of instructions which when executed by the processor cause the processor to receive input via the interface designating a management node and a first set of relationships between the management mode and at least one edge processor and generate a management hierarchy between the management node and the at least one edge processor based on the first set of relationships.

In one embodiment, a computer readable medium stores a set of code modules which when executed by a processor of computer system cause the processor to manage a plurality of edge processors. The computer readable medium includes code for providing an interface that allows a user to define a management hierarchy between a plurality of edge processors, code for receiving input via the interface designating a management node and a first set of relationships between the management mode and at least one edge processor, and code for generating a management hierarchy between the management node and the at least one edge processor based on the first set of relationships.

In some embodiments, a system for managing a plurality of edge processors includes a set of sensor devices, a set of first devices, a set of second devices, and a central node. The first set of devices is configured as edge nodes in a management hierarchy that manage one or more sensor devices. Each edge node transmits sensor data collected from the one or more sensor devices managed by the edge node to a parent node in the management hierarchy associated with the edge node, receives management information from the parent node, and performs one or more operations based on the first management information. The second set of devices is configured as topology nodes in the management hierarchy that manage one or more edge nodes. Each topology node transmits sensor data from the one or more edge nodes managed by the topology node to a parent node in the management hierarchy associated with the topology node, receives management information from the parent node, and performs one or more operations based on the second management information. The central node is configured as a root topology node in the management hierarchy that manages one or more topology nodes. The root topology node collects sensor data from the one or more topology nodes managed by the root topology node and transmits management information to the plurality of topology nodes.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Embodiments of the present invention generally relate to sensor technologies and more specifically to techniques for virtualization and quality of sensor data. In order to better understand the present invention, aspects of the environment within which the invention operates will first be described.

In order to better understand the present invention, aspects of the environment within which various embodiments operate will first be described.

Collection of Sensor Data

In various embodiments, methods and systems for collection of sensor data that may incorporate embodiments of the present invention augment enterprise software with RFID and sensor technologies. The methods and systems generally provides a faster reasons loop, greater visibility, an extensible framework, and scalability for the collection of sensor data from a variety of sensor devices and the processing of sensor data by a variety of applications. The systems typically can be deployed in locations where sensor devices can provide better insight into business processes.

In various embodiments, the methods and systems provide localized management and control of sensor devices through an extensible framework and interface. The methods and systems can funnel data sensor and environment data from RFID readers and sensor device, typically located at the periphery of an enterprise, for access by core applications.

Figure 1:
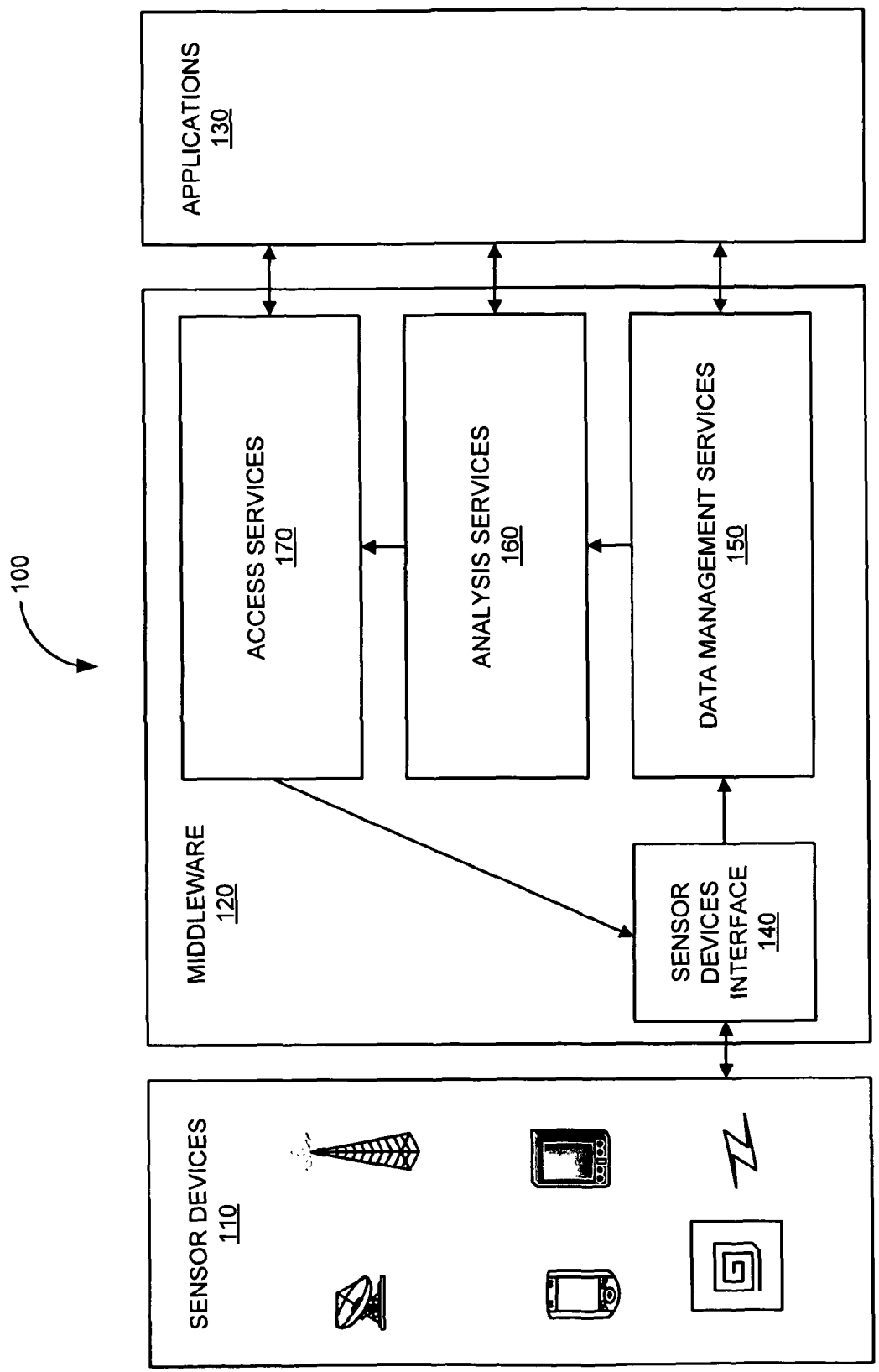
FIG. 1 is a simplified block diagram of a system that may incorporate embodiments of the present invention.

FIG. 1 illustrates a simplified block diagram of a system 100 that may incorporate embodiments of the present invention. FIG. 1 is merely illustrative of an embodiment incorporating the present invention and does not limit the scope of the invention as recited in the claims. One of ordinary skill in the art would recognize other variations, modifications, and alternatives.

As shown in FIG. 1, system 100 includes sensor devices 110, middleware 120, and applications 130. Middleware 120 is communicatively coupled to sensor devices 110 and to applications 130. Middleware 120 includes sensor devices interface 140, data management services 150, analysis service 160, and access services 170.

Sensor devices 110 include contactless cards, transponders, RFID tags, smart labels, fixed interrogators/readers, mobile readers, handheld readers, image capture devices, video captures devices, audio capture devices, environmental sensing devices (e.g., temperature, humidity, and air pressure sensors), location information devices (e.g., Global Positioning System), weight sensing devices, notification and alert generation devices, and the like. One example of an RFID tag is described further with respect to FIG. 2. One example of an RFID reader is described further with respect to FIG. 3. In some embodiments, sensor devices 110 include hardware and/or software elements that respond to external input from middleware 120 to perform actions, manipulate objects, and the like.

In general, middleware 120 includes hardware and/or software elements that provide an interface for using sensor devices 110. In this example, middleware 120 includes sensor devices interface 140, data management services 150, analysis service 160, and access services 170.

Sensor devices interface 140 includes hardware and/or software elements that communicate with sensor devices 110. One example of sensor devices interface 140 is Oracle's Application Server: Sensor Edge Server from Oracle Corporation, Redwood Shores, Calif. In various embodiments, sensor devices interface 140 receives sensor data from sensor devices 110. In some embodiments, sensor devices interface 140 communicates with one or more of sensor devices 110 to provide external input from middleware 120 to cause the one or more of sensor devices 110 to display notifications and alerts, and to perform responses, actions, or activities (e.g., control a conveyor belt or robot).

In general, sensor data is any information, signal, communication, and the like, received from sensor devices 110. Some examples of sensor data are unique, or semi-unique identifiers associated with RFID tags, temperature information received from a temperature sensor, data and information associated with humidity and pressure, position and location information, still-image data, video sequence data, motion picture data, audio data, and the like.

Data management services 150 include hardware and/or software elements that provide storage of and access to collected sensor data. Some examples of data management services 150 include databases, storage arrays, storage area networks, network attached storage, data security devices, data management devices, and the like.

Analysis services 160 include hardware and/or software elements that provide analysis of collected sensor data. Some examples of analysis which may be performed by analysis services 160 include business intelligence, business process management, inventory management, distribution and supply chain management, accounting, reporting, and the like.

Access services 170 include hardware and/or software elements that provide access to features of middleware 120. In various embodiments, access services 170 include hardware and/or software elements that manage sensor devices 110 through sensor devices interface 140. In some embodiments, access services 170 include hardware and/or software elements provide access to sensor data via data management services 150. In some embodiments, access services 170 include hardware and/or software elements that provide access to analysis services 160. For example, in various embodiments, access services 170 provides one or more users or computer processes with a portal using web services to access sensor data from analysis services 160 and data management services 150. In further embodiments, access services 170 allows the one or more users or computer processes to initiate or coordinate actions or activities using sensor devices 110 through sensor devices interface 140.

Applications 130 include hardware and/or software elements that access sensor data and/or control sensor devices 110 through middleware 120. Some examples of applications 130 are Oracle's E-Business Suite, PeopleSoft Enterprise, and J D Edwards Enterprise from Oracle Corporation, Redwood Shores, Calif.

In one example of operation, system 100 collects sensor data from one or more of sensor devices 110 (e.g., an RFID reader). For example, a plurality of RFID readers detect the presents of a plurality of RFID tags at various times during the movement of objects in a warehouse or at locations in a supply-chain.

In this example, middleware 120 collects the sensor data via sensor devices interface 140, and stores the sensor data using data management services 150. Middleware 120 provides access and analysis of collected and stored sensor data to applications 130 via analysis service 160 and access services 170. Accordingly, system 100 provides a framework for accessing a wide variety of sensor devices to obtain sensor data from a variety of applications.

In various embodiments, system 100 deployed in locations where sensor devices 110 can provide better insight into business processes. System 100 provides greater visibility of sensor data by allowing non-vendor specific applications to have access to sensor data. This extensible framework also provides scalability for the collection of sensor data from a variety of sensor devices. In various embodiments, system 100 provides localized management and control of sensor devices 100 through middleware 130 and sensor devices interface 140.

Hierarchical Network Management Infrastructure

In various embodiments, system 100 provides a hierarchical network infrastructure to manage edge processing nodes. In general, edge processors handle real-time tasks associated with sensor devices. For example, an edge processor may collect sensor data from one or more sensor devices, and manage the day-to-day operation of the sensor devices. The edge processor may be a host on a PC coupled to automation equipment, or an embedded host coupled to an RFID sensor.

In general, a hierarchal network infrastructure allows for federated edge processors to be managed within in a single view. Each of edge processors, and their underlying physical sensor devices may be managed with centralized policies and access controls. The hierarchal network infrastructure supports multiple levels of administration access, such as local administrators in central administrators.

Figure 2:
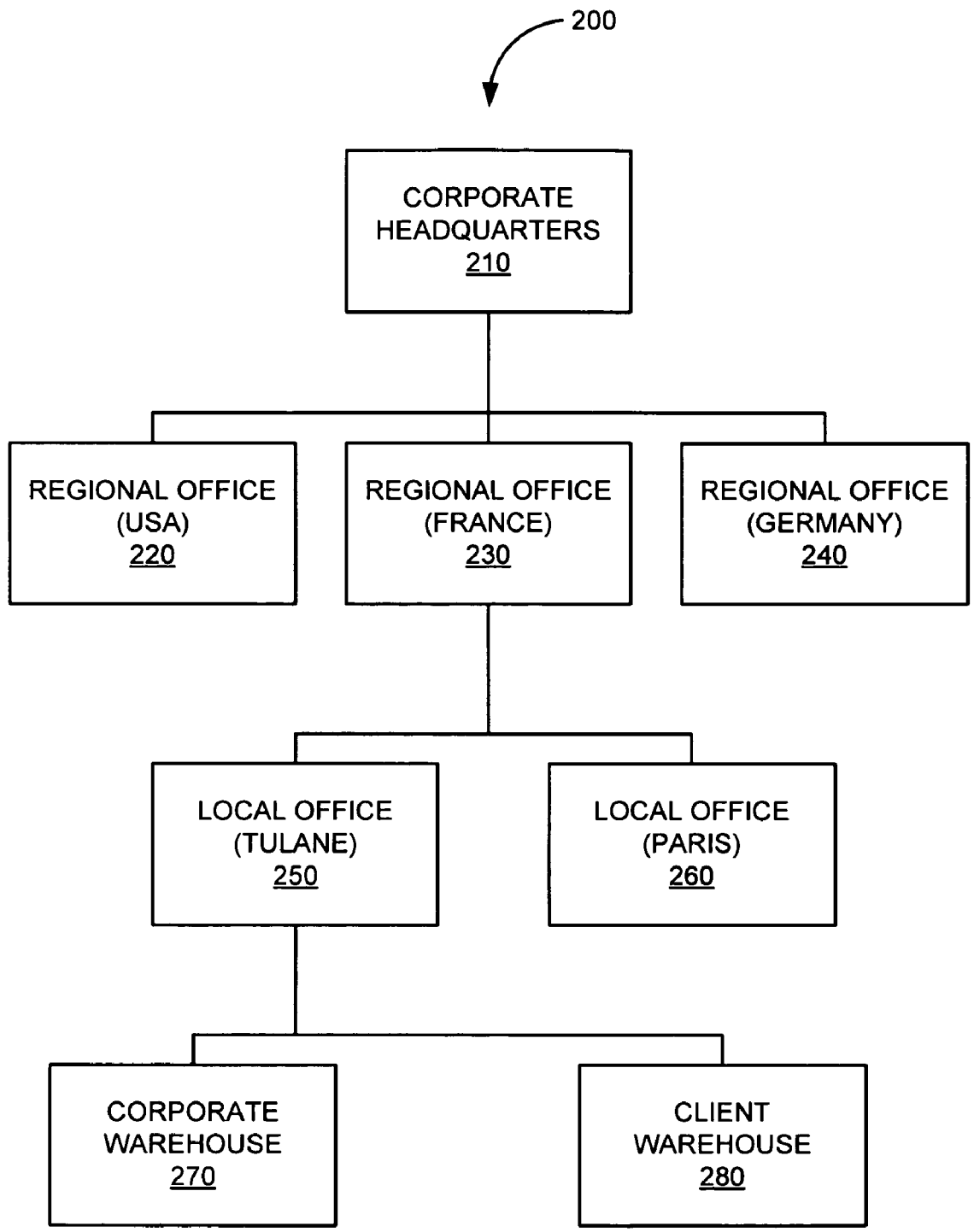
FIG. 2 is a block diagram of an exemplary organization.

FIG. 2 is a block diagram of an exemplary organization 200. In this example, organization 200 includes corporate headquarters 210 linked to regional offices (USA) 220, (France) 230, and (Germany) 240. Regional office 230 is linked to local offices (Tulane) 250 and (Paris) 260. Local office 250 is linked to a corporate warehouse 270 and a client warehouse 280.

Different management nodes in each of the offices can be linked to form a cross-country corporate network managed by corporate headquarters 210. Once linked, all configuration changes and sensor data can be automatically synchronized with each of the regional offices in the local offices, such as using push and pull models. Thus, the hierarchical network infrastructure allows telemetry information to be relayed allowing the information corporate warehouse 270 and client warehouse 280 to be trickled up the management chain, and further provides host management of hardware and the software running on it. In some embodiments, a full audit trail may be provided.

Figure 3:
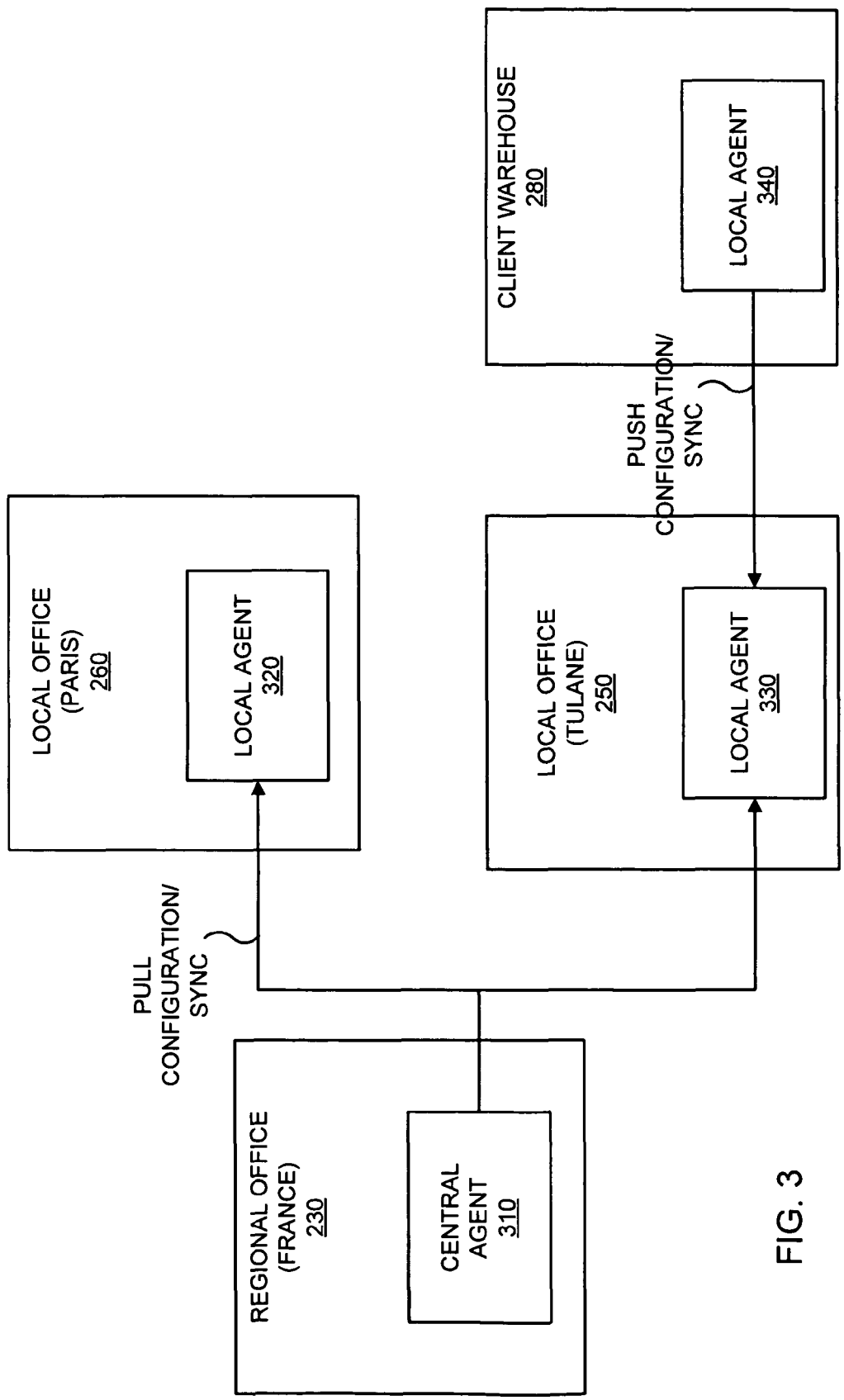
FIG. 3 is a block diagram of a physical layout associated with a management hierarchy in one embodiment according to the present invention.

FIG. 3 is a block diagram of a physical layout associated with a management hierarchy in one embodiment according to the present invention. Here, regional office 230 includes a central agent 310. Central agent 310 may be dedicated hardware, an embedded device, and/or a software program executing on a PC, workstation, server computer, and the like. Central agent 310 may provide one or more graphical user interfaces and communicate using one or more protocols, such as TCP/IP, HTTP, e-mail, FTP, web services, and the like.

In general, central agent 310 manages local agent 320 in local office 260, local agent 330 and local office 250, and further may manage local agent 340 and client warehouse 280. Local agents 320, 330, and 340 may be dedicated hardware, an embedded device, and/or a software program executing on a PC, workstation, server computer, and the like. A local agent may be an application executing on an edge processors configured to collect sensor data from sensor devices.

In some embodiments, a local agent may be a virtual node representing a collection of one or more sensor devices, one or more edge processors, or one or more central agents.

In one example of operation, central agent 310 collects sensor data from each of the local agents. Central agent 310 may propagate the collected sensor data upstream to another host acting as a central agent or root central node. Central agent 310 may further generate messages, instructions, and the like to the local agents to synchronize local sensor data and/or instruct the local agents to perform one or more operations. Central agent 310 may further received messages, policies, sensor data, and the like from upstream nodes to be propagated to downstream agents or devices.

In one embodiment, central agent 310 uses a "pull model" to obtain configuration and synchronize information with local agent 320 and 330. For example, central agent 310 may connect over a communication network, such as the Internet, to local agent 320 executing as an application server running a web application. In effect, central agent 310 sends the request and pulls information from local agent 320.

In another embodiment, local agent 340 uses a "push model" to synchronize information and obtain configuration with local agent 330. For example, local agent 340 may be placed behind a firewall at client warehouse 280. Local agent 330 then would be unable to connect to local agent 340 using a pull model unless one or more ports associated with the firewall had been configured to allow such communication. Thus, local agent 340 may connect over a communication network, such as the Internet, to local agent 330. In effect, local agent 330 pushes information to local agent 330. The synchronization of data using the pull or push models may occur in realtime, network time, or using batch processing.

Figure 4:
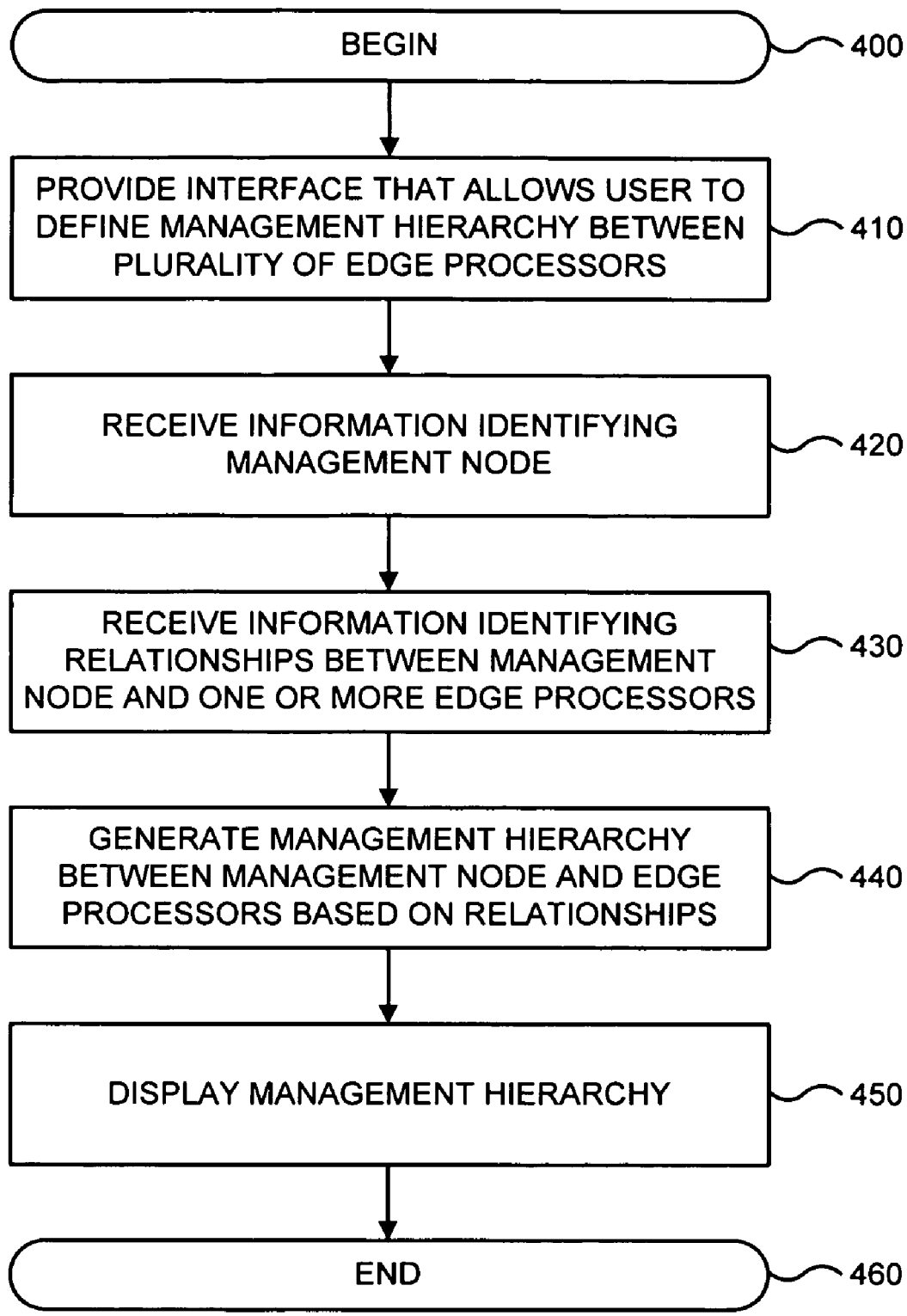
FIG. 4 is a flowchart of a method for generating a management hierarchy in one embodiment according to the present invention.

FIG. 4 is a flowchart of a method for generating a management hierarchy in one embodiment according to the present invention. The processing depicted in FIG. 4 may be performed by software modules (e.g., instructions or code) executed by a processor of a computer system, by hardware modules of the computer system, or combinations thereof. FIG. 4 begins in step 400.

In step 410, an interface is provided that allows a user to define a management hierarchy between a plurality of edge processors. One example of an interface described further with respect to FIG. 8.

In step 420, information is received by the interface identifying a management node. In general, a management node is any device configured to manage one or more edge processors. The management node may be further configured to manage sensor devices associated with an edge processor. The management node may be identified by a Uniform Resource Identifier (URI), such as <protocol><servername><port number>.

In step 430, information is received identifying a set of relationships between the management node and one or more edge processors. For example, a user may create a link via the interface indicating that the management node is a parent node of the one or more edge processors.

In step 440, a management hierarchy is generated between the management node and the one or more edge processors based on the set of relationships. The management hierarchy may further define how the management node communicates with the one or more edge processors, for example using a pull model and the like. The management hierarchy may further define a schedule for updating or synchronizing information between the management node and the one or more edge processors. The management node may also include information associated with corporate policies, business rules, security information, access controls, and the like.

In step 450, the management hierarchy is displayed. For example, computer system may generate a graphical representation of the management hierarchy for display on a display device, including the set of relationships between the management node and the one or more edge servers. A user then may be able to interact with the management hierarchy, for example, by clicking on an icon representing the management node or the one or more edge processors to obtain information associated with the selected node. FIG. 4 ends in step 460.

In various embodiments, the management hierarchy may include relationships between various types of nodes. Some examples of nodes in the management hierarchy are "Local Virtual Nodes" representing nodes created for management reasons or for defining spatial regions, "Remote Virtual Nodes" that inherit from child servers, "Edge Nodes" that point to a remote edge processor, and "Device Nodes" that represent physical devices.

Figure 5A:
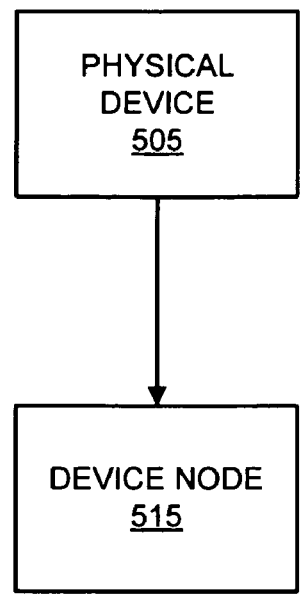
FIGS. 5A and 5B are block diagrams illustrating relationships between physical devices and device nodes in a management hierarchy in one embodiment according to the present invention.
Figure 5B:
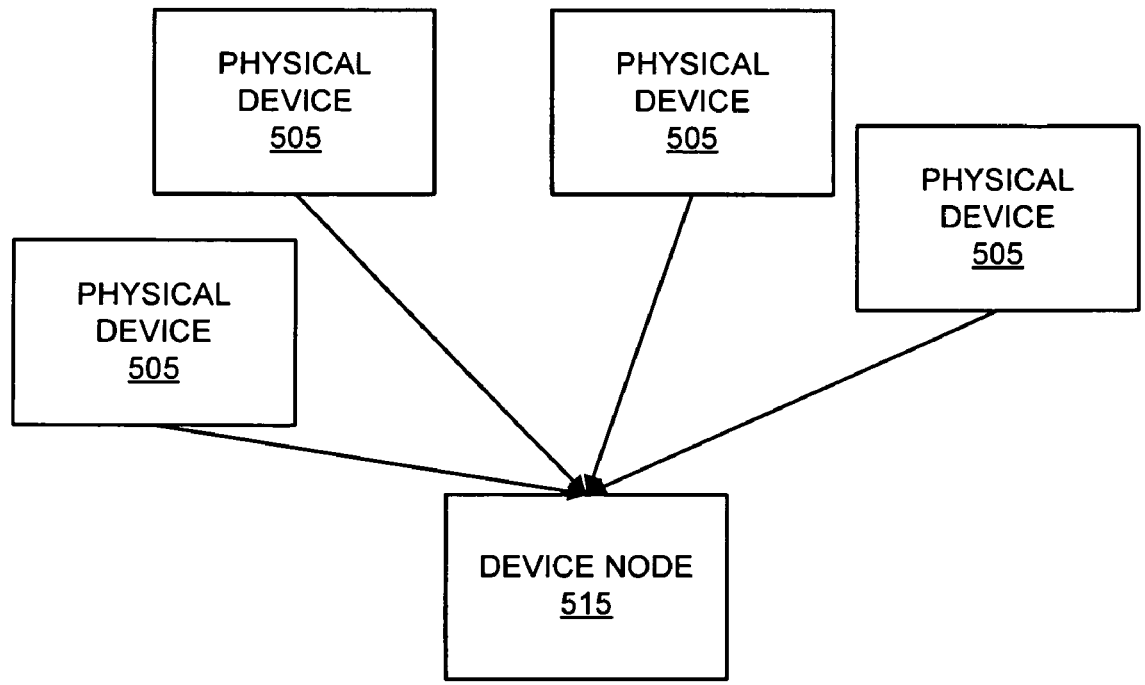

FIGS. 5A and 5B are block diagrams illustrating relationships between physical devices and device nodes in a management hierarchy in one embodiment according to the present invention. In this example, a physical device 505 is represented in the management hierarchy by a device node 515. Device node 515 may include attributes associated with physical device 505, such as the type of device, its location, information for managing operation of the device, information for retrieving sensor data provided by the device, and the like.

FIG. 5B illustrates that a plurality of physical devices 505 may be aggregated into a single virtual device node 515. Accordingly, sensor data obtained from each of the plurality of sensor devices 505 may appear to an upstream parent node to be originating from a single virtual device node 515 in the management hierarchy. Furthermore, the single virtual device that 515 may be selected propagate management information and/or perform an operation, in which the management information and/or instruction to perform the operation is sent to each of the plurality of physical devices 505 in the aggregation.

Figure 6A:
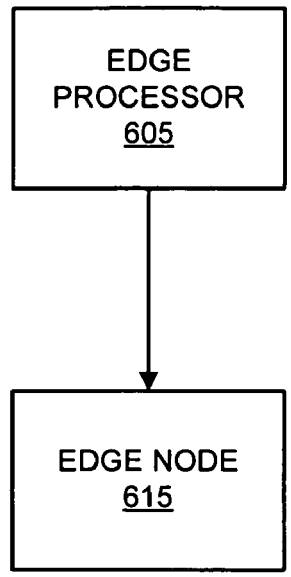
FIGS. 6A and 6B are block diagrams illustrating relationships between edge processors and edge nodes in a management hierarchy in one embodiment according to the present invention.
Figure 6B:
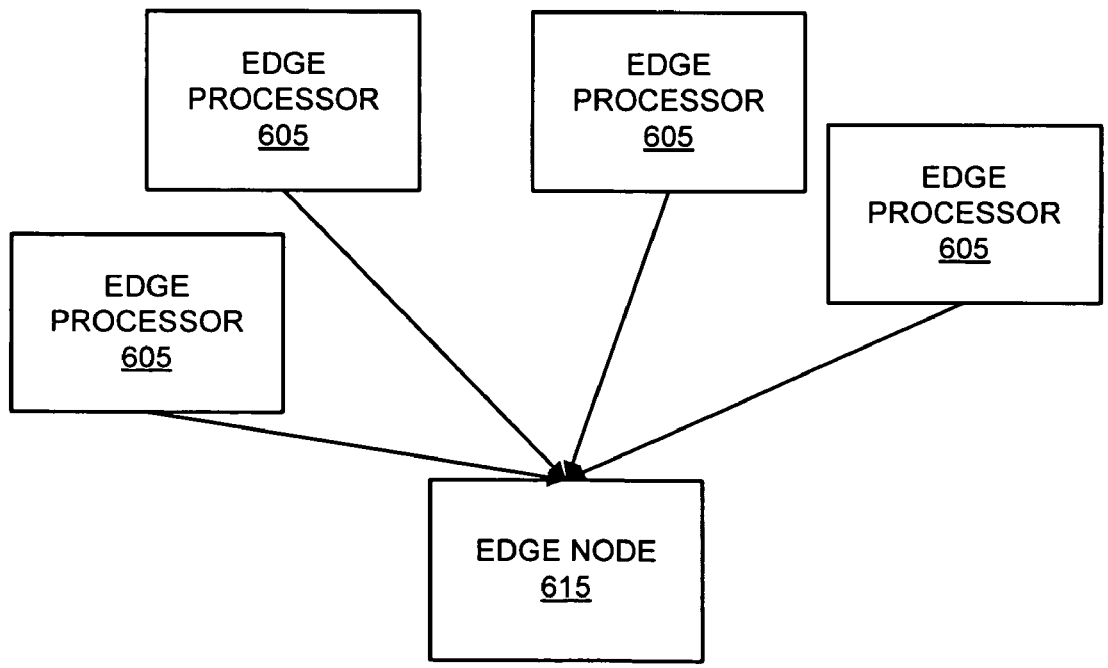

FIGS. 6A and 6B are block diagrams illustrating relationships between edge processors and edge nodes in a management hierarchy in one embodiment according to the present invention. In this example, an edge processor 605 is represented in the management hierarchy by an edge node 615. Edge node 515 may include attributes associated with edge processor 605, such as the type of device, its location, information for managing operation of the device, information for retrieving sensor data collected by the device, and the like. FIG. 6B illustrates that a plurality of edge processors 605 may be aggregated into a single virtual edge node 615.

In some embodiments, an edge node may be designated as a management node or topology node. The management node or topology node may be accessible by a local administrator or a remote administrator to manage an edge processor and or sensor devices associated with an edge processor.

Figure 7:
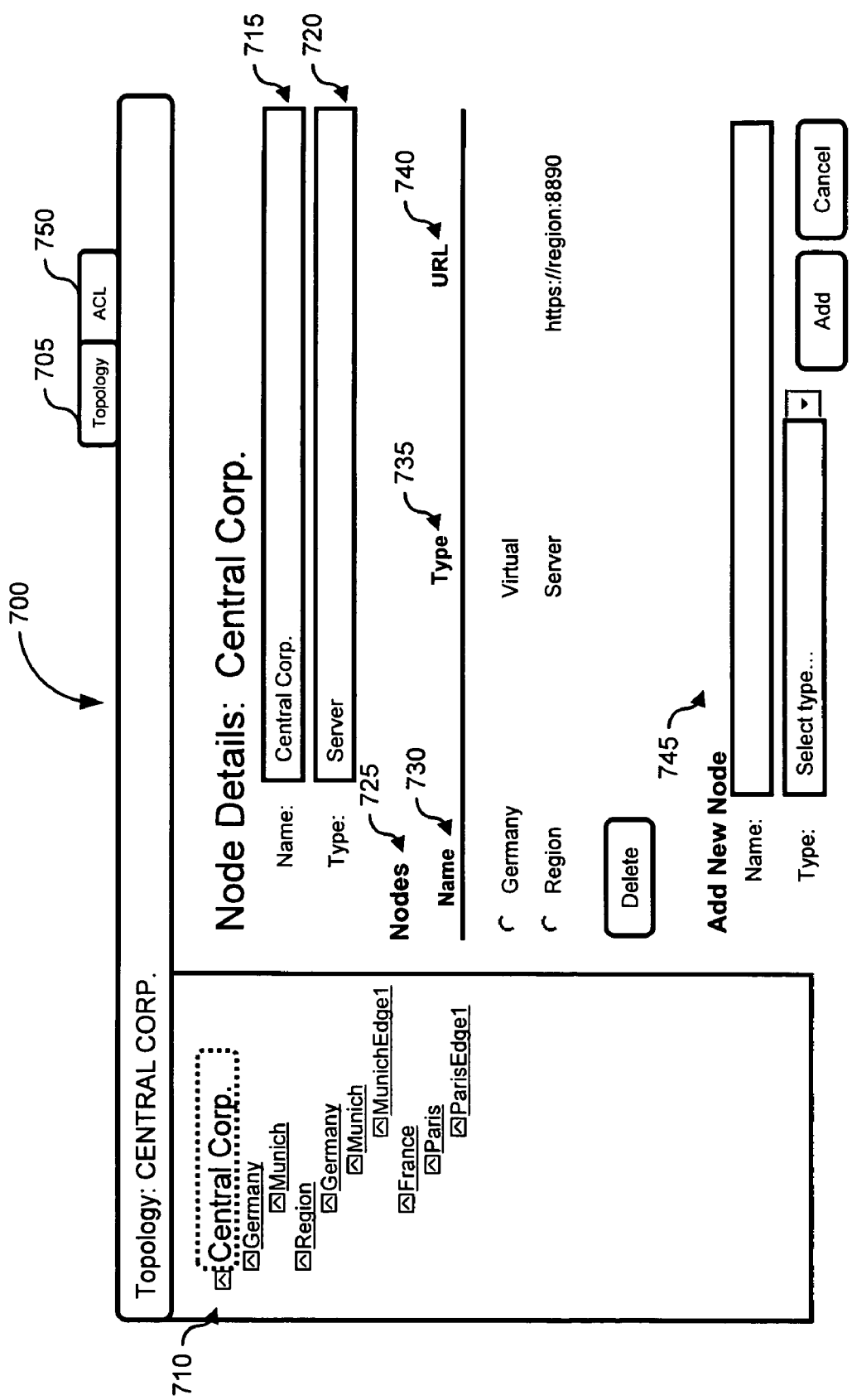
FIG. 7 is a screenshot of an interface for creating a management hierarchy, and managing nodes within the management hierarchy in one embodiment according to the present invention.

FIG. 7 is a screenshot of an interface 700 for creating a management hierarchy, and managing nodes within the management hierarchy in one embodiment according to the present invention. In this example, interface 700 includes a topology display 705 on which a hierarchy of topology nodes 710 is included. For example, hierarchy 710 may include a root node entitled "Central" with two children nodes entitled "Germany" and "REGION." The node entitled "Germany" includes a child node entitled "Munich." The node entitled "REGION" includes two children nodes, one again entitled "Germany" and another entitled "France." The second node entitled "Germany" includes a child node entitled "Munich,"

which includes a child node entitled "MunicEdge1." The node entitled "France" includes a child node entitled "Paris," which includes a child node entitled "ParisEdge1."

In one example, upon selecting a node, such as the "CENTRAL" root node, information about the node is presented in name item 715 and type item 720. Name item 715 generally displays a name or identifier associated with the node. Type item 720 generally displays the type of node, such as server, virtual, topology, management, and the like.

In various embodiments, if one or more children nodes are present in hierarchy 710 beneath a selected node (e.g., "CENTRAL), the one or more nodes are such displayed in area 725. For example, information associated with the nodes entitled "Germany" and "REGION" may be displayed in area 725. In one example, a name item 730, a type item 735, and a URL item 740 are displayed. Name item 730 generally displays a name or identifier associated with a node. Type item 735 generally displays the type of node, such as server, virtual, topology, management, and the like. URL item 740 displays a uniform resource locator or identifier associated with a node (e.g., "http://rserver:8990").

Interface 700 may also include an area 745 that may allows a user to add new nodes to hierarchy 710. For example, a user may input a name and a type, and click an "ADD" button to add a new child node to a selected parent node.

In some embodiments, interface 700 includes an access control list (ACL) display 750. ACL display 750 may allow a user to input information indicative of access information, security controls, policies, and the like.

Accordingly, a management hierarchy may be established that defines relationships between nodes that allows for federated edge processors to be managed within in a single view (e.g., interface 700). Each of edge processors, and their underlying physical sensor devices may be managed with centralized policies and access controls. The hierarchal network infrastructure can also support multiple levels of administration access, such as local administrators in central administrators that allow the synchronization of telemetry and other management information between nodes.

Figure 8:
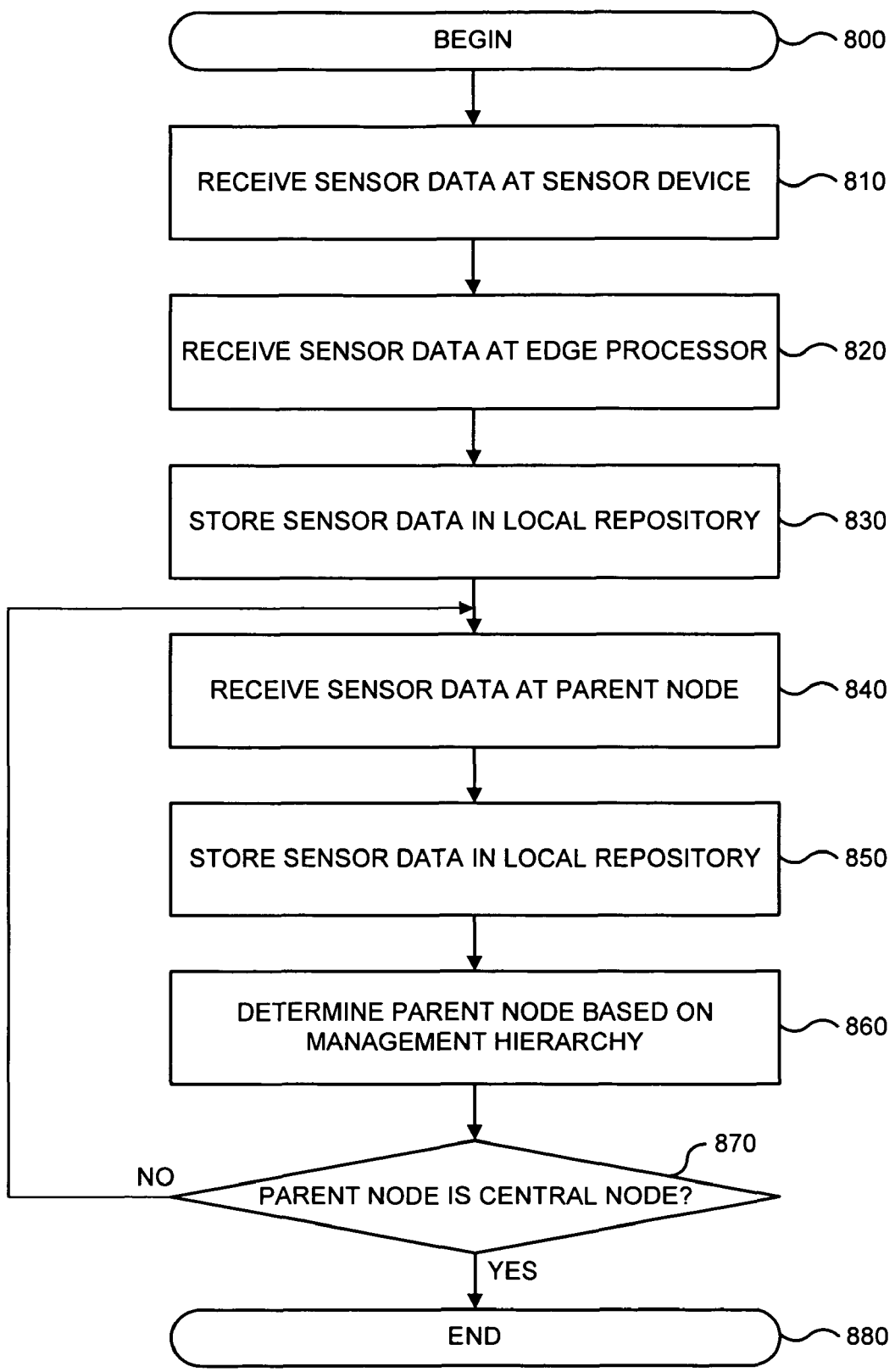
FIG. 8 is a flowchart of a method for synchronizing sensor data using a management hierarchy in one embodiment according to the present invention.

FIG. 8 is a flowchart of a method for synchronizing sensor data using a management hierarchy in one embodiment according to the present invention. FIG. 8 begins in step 800.

In step 810, sensor data is received at a sensor device. For example, a mobile or fixed RFID reader may read tag information associated with one or more tags. In step 820, sensor data is received at an edge processor. For example, the mobile or fixed RFID reader of the previous example made forward the tag information to the edge processor entitled "MunichEdge1" of FIG. 7. Alternatively, the edge processor "MunichEdge1" may poll in the mobile or fixed RFID the reader for collected sensor data.

In step 830, the sensor data is stored in a local repository. For example, the sensor data may be stored in a local database at the edge processor "MunichEdge1." In another example, the sensor data may be stored in a database located in a branch office in which the edge processor "MunichEdge1" is located (e.g., the "Munich" Germany branch office).

In step 840, the sensor data is received at a parent node. For example, the edge processor "MunichEdge1" may forward the sensor data to the server associated with the node entitled "Munich" of FIG. 7. In various embodiments, the node entitled "Munich" may be associated with an actual server or edge processor. In some embodiments, the node entitled "Munich" may be associated with a logical or virtual node defined by the management hierarchy.

In step 850, the sensor data is stored in a local repository. For example, the node entitled "Munich" may be associated with an actual physical server that includes a database or that may access a database.

In step 860, a parent node is determined based on the management hierarchy. In step 880, if the parent node is not a root or central node, the sensor data is received at the parent node in step 840. If the parent node is the central or root node, the sensor data has been propagated up through the management hierarchy and is locally stored with the root node.

Therefore, the management hierarchy defines the relationships between nodes that may be scattered over geographic and/or physical areas. This allows for federated edge processors to be managed within in a single view, such that the telemetry information can be propagated up the management hierarchy. FIG. 8 ends in step 880.

Figure 9:
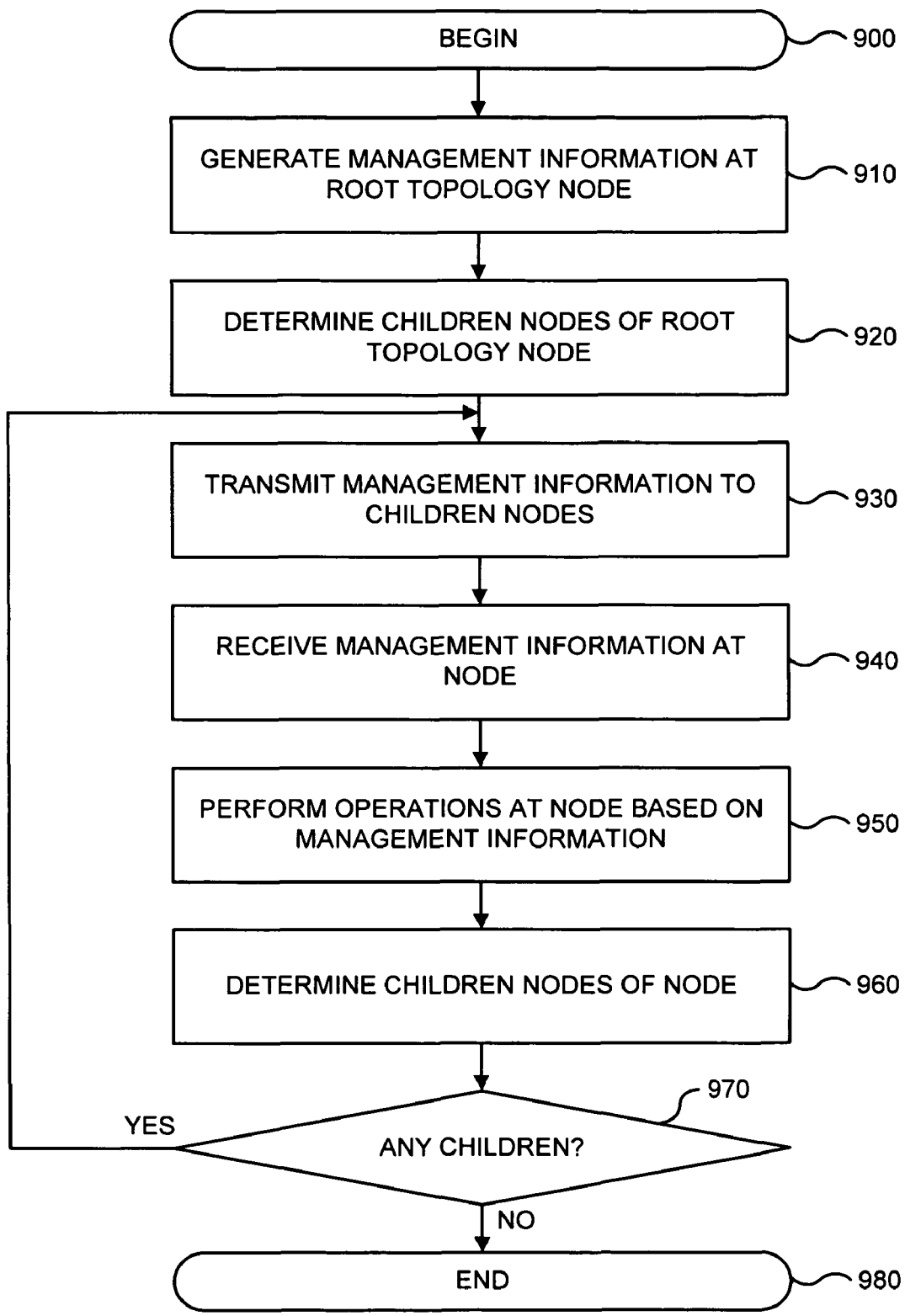
FIG. 9 is a flowchart of a method for managing edge processors from a root topology node in a management hierarchy in one embodiment according to the present invention.

FIG. 9 is a flowchart of a method for managing edge processors from a root topology node in a management hierarchy in one embodiment according to the present invention. FIG. 9 begins in step 900.

In step 910, management information is generated at a root topology node. Some examples of management information are policies, access controls, security patches, applications, and the like. In one example, management information includes a set of rules configured to retrieve, format, and distribute sensor data to nodes in a management hierarchy. In another example, management information includes enterprise policies that administer global and/or local access to resources, such as sensor data, device information and/or control, user information and/or control, inventory information and/or control, and the like. In another example, management information includes one or more operations to be performed by a specific node or group of nodes. The operations may include reading data, formatting data, distributing data, and the like.

In step 920, one or more children nodes of the root topology node are determined. For example, referring to FIG. 7, the children nodes of the root topology node entitled "CENTRAL" include the nodes entitled "Germany" and "REGION." In step 930, the management information is transmitted to the one or more children nodes. For example, the root topology node entitled "CENTRAL" may push the management information to the one or more children nodes. In another example, the one or more children nodes may request the management information from the root topology node.

In step 940, the management information is received at a node. For example, the management information as received at one of the one or more children nodes of the root topology node. In step 950, one or more operations are performed at the node based on the management information. For example, the management information may indicate an operation to read sensor data from one or more sensor devices. In another example, the management information may indicate an enterprise policy implementing security at an edge processor.

In step 960, one or more children nodes of the node are determined. For example, for the node entitled "REGION," the children nodes of "Germany" and "France" are determined. In step 970, if there exist any children nodes, the management information is transmitted to the children nodes in step 930. Therefore, the federated edge processors can be managed such that management information can be propagated down the management hierarchy to each of the nodes. If there are no children nodes, FIG. 10 ends in step 1080.

Network Mass Operation Infrastructure

In various embodiments, a plug-in architecture may be added to the management hierarchy. The plug-in architecture may allow an administrator to perform operations in a well-defined subset of nodes within the federated nodes defined by the management hierarchy. The plug-in architecture provides support for creating management views, access controls, and further allows a local user/administrator to create and deploy their own decentralized management control tasks.

Typically, these types of tasks have to be performed manually at each individual node or edge processor. There is no easy way to find out if an error occurs at an individual node. The plug-in architecture allows operations to be performed across transaction boundaries of nodes in a uniform manner. The plug-in architecture also allows an administrator to specify propagation of telemetry information, implement security and access controls, and define a consistent user experience across all federated nodes.

Figure 10:
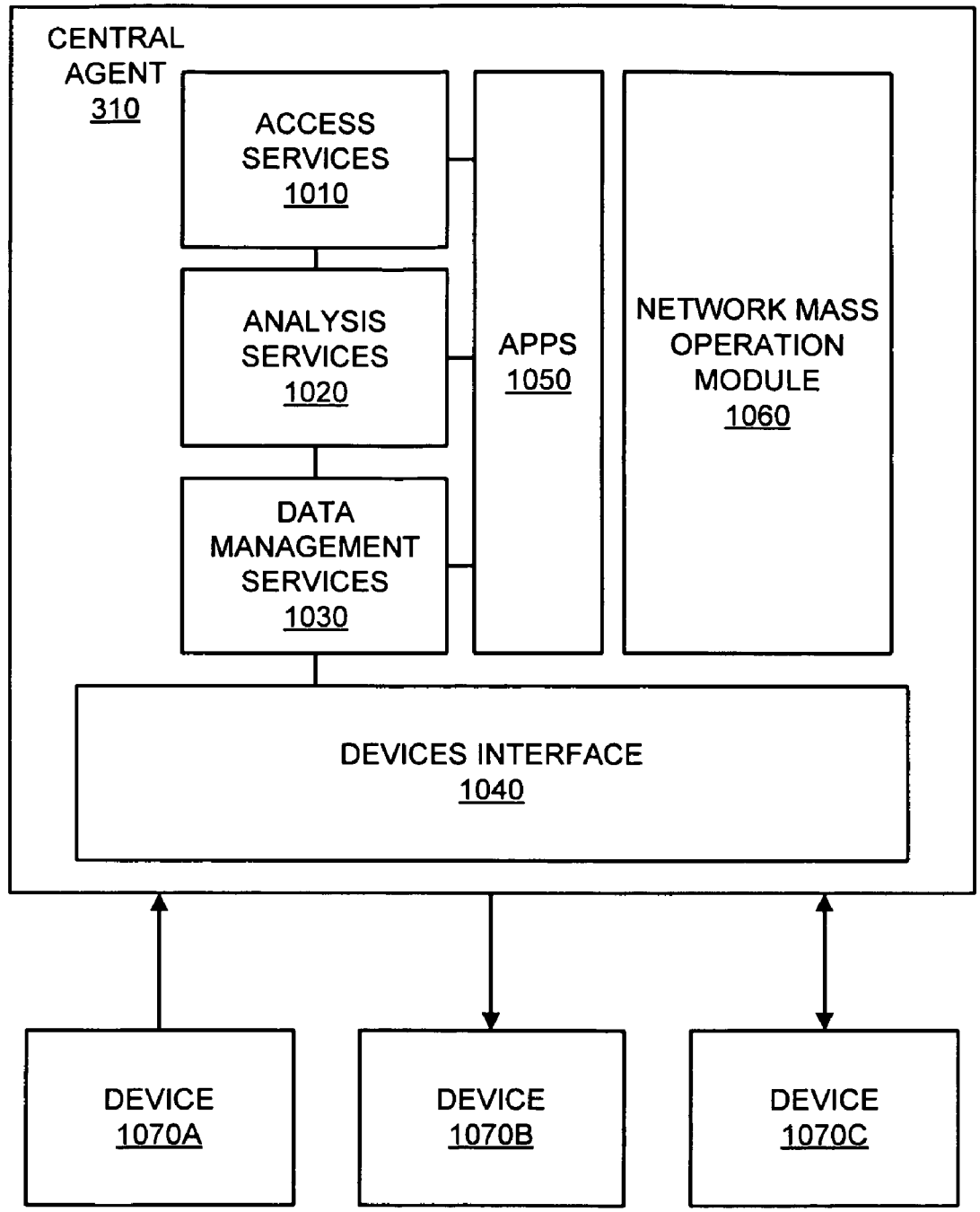
FIG. 10 is block diagram of a central agent for performing network mass operations in one embodiment according to the present invention.

FIG. 10 is block diagram of central agent 310 of FIG. 3 for performing network mass operations in one embodiment according to the present invention. In this example, central agent 310 includes access services 1010, analysis services 1020, data management services 1030, devices interface 1040, applications 1050, and mass operation module 1060. Central agent 310 may be coupled to one or more devices 1070 (e.g., device 1070A, device 1070B, and device 1070C) that collect sensor data or that may be instructed to perform operations, such as opening/closing switches, controlling information displays, routing inventory, and the like.

Mass operation module 1060 includes hardware and/or software elements configured to provide a plug-in infrastructure that allows mass operations written by a user or administrator to be uploaded to central agent 310. This allows administrators to apply and define operations and policies that span across networks in different countries that are managed by the hierarchal network management infrastructure.

In general, mass operation module 1060 receives a mass operation that defines at least a target, data, and logic. Typically, a mass operation is formatted according to a structured language or markup language, such as the extensible markup language (XML). The mass operation may also be compiled into a binary executable format.

Each mass operation is associated with a definition file (e.g., "operation.xml"). The definition file defines what the operation does, who should perform it, and also defines any user interfaces that may be required to initiate or perform the operation. A mass operation further includes external processing logic, such as a Business Process Execution Language (BPEL) definition file. The external processing logic can define business processes that interact with external entities through Web Service operations defined using Web Services Description Language (WSDL), and that manifest themselves as Web services defined using WSDL, and define data manipulation functions for simple manipulation of data needed to define process data and control flow.

A mass operations may define one or more user interfaces that prompt an administrator for parameters before applying a mass operation. These user interfaces may be textual or graphically generated. In some embodiments, a mass operation includes information that provide scheduling of the mass operation.

Each mass operations defines a target. A target can be any node within a management hierarchy or a group of nodes. A target may also be an identifier for a single node or group of nodes, such as a geographic, regional, functional, corporate, or organizational identifier. In various embodiments, the mass operation to find a starting node to act on, and defines an exception list to filter out nodes when traversing the management hierarchy to cascade the mass operation to children nodes of the starting node.

In some embodiments, the mass operation defines a workflow approval process. For example, the mass operation may optionally enable it in approval workflow requesting an electronic signature, review, or approval of a supervisory administrator, a local administrator, or a user, and the like.

Figure 11:
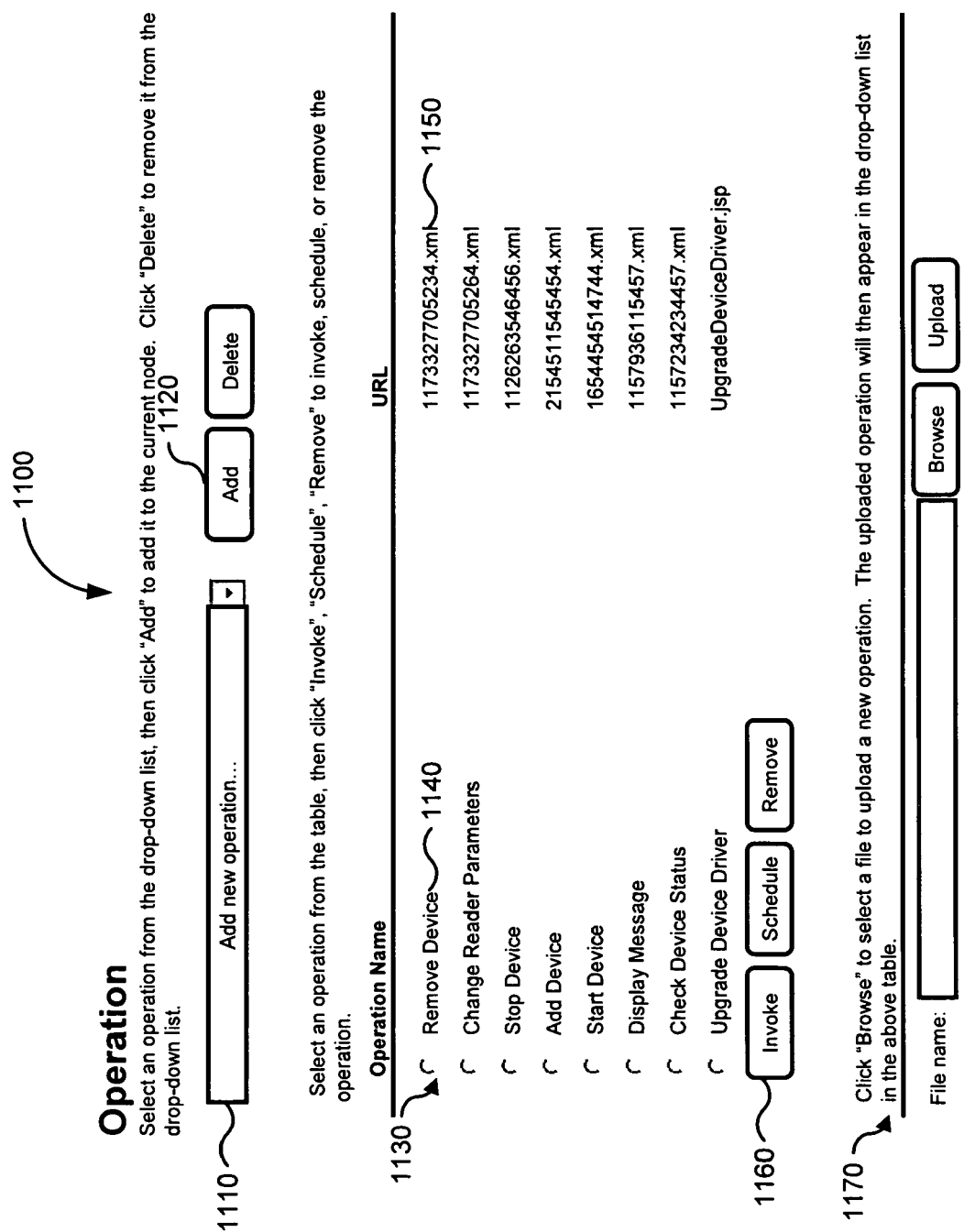
FIG. 11 is one example of an interface for uploading and invoking network mass operations in one embodiment according to the present invention.

FIG. 11 is one example of an interface 1100 for uploading and invoking network mass operations in one embodiment according to the present invention. In one embodiment, interface 1100 includes a drop-down list 1110 that allows an administrator to select a mass operation that has been previously uploaded to or stored on a node, such as a sensor edge server. After selecting a mass operation, the administrator may then add the operation to the current operations assigned to the node by selecting button 1120 labeled "Add." This adds the selected mass operation to a set of operations associated with the node as shown in list 1130.

In this example, list 1130 of mass operations includes operations associated with "removing a device," "changing reader parameters," "stopping a device," "adding a device," "starting a device," "displaying a message," "checking a devices status," and "upgrading a device driver." Interface 1100 further displays a uniform resource locator or URL associated with each of the mass operations assigned to the node. For example, mass operation 1140 entitled "Remove Device" is associated with URL 1150 labeled "1173327705234.xml." Clicking on URL 1150 allows the administrator to view the XML contents that define the mass operation.

The administrator may select an operation from list 1130, and then invoke the operation, schedule the operation, or remove the operation from list 1130. For example, the administrator may select mass operation 1140 entitled "Remove Device" and press a button 1160 entitled to "Invoke" to perform an operation that removes a device identified in the mass operations definition from the node on which the operation is performed. In one example, the mass operations 1140 may be invoked at a virtual node, which is used for management purposes and does not have any sensor devices physically attached, and the mass operations can be propagated and performed at children nodes of the virtual node.

The administrator may further upload new mass operations onto the node in area 1170. For example, the administrator may select the file name of a mass operation definition file and upload the mass operation onto the node. The administrator then may select the newly added mass operation in the drop-down list 1110 to assigned to mass operation to the node.

Accordingly interface 1110 allows the administrator to perform operations on the local node, or a well-defined subset of nodes. Interface 1110 further allows other users or local administrators to create and deploy their own decentralized management tasks.

Figure 12:
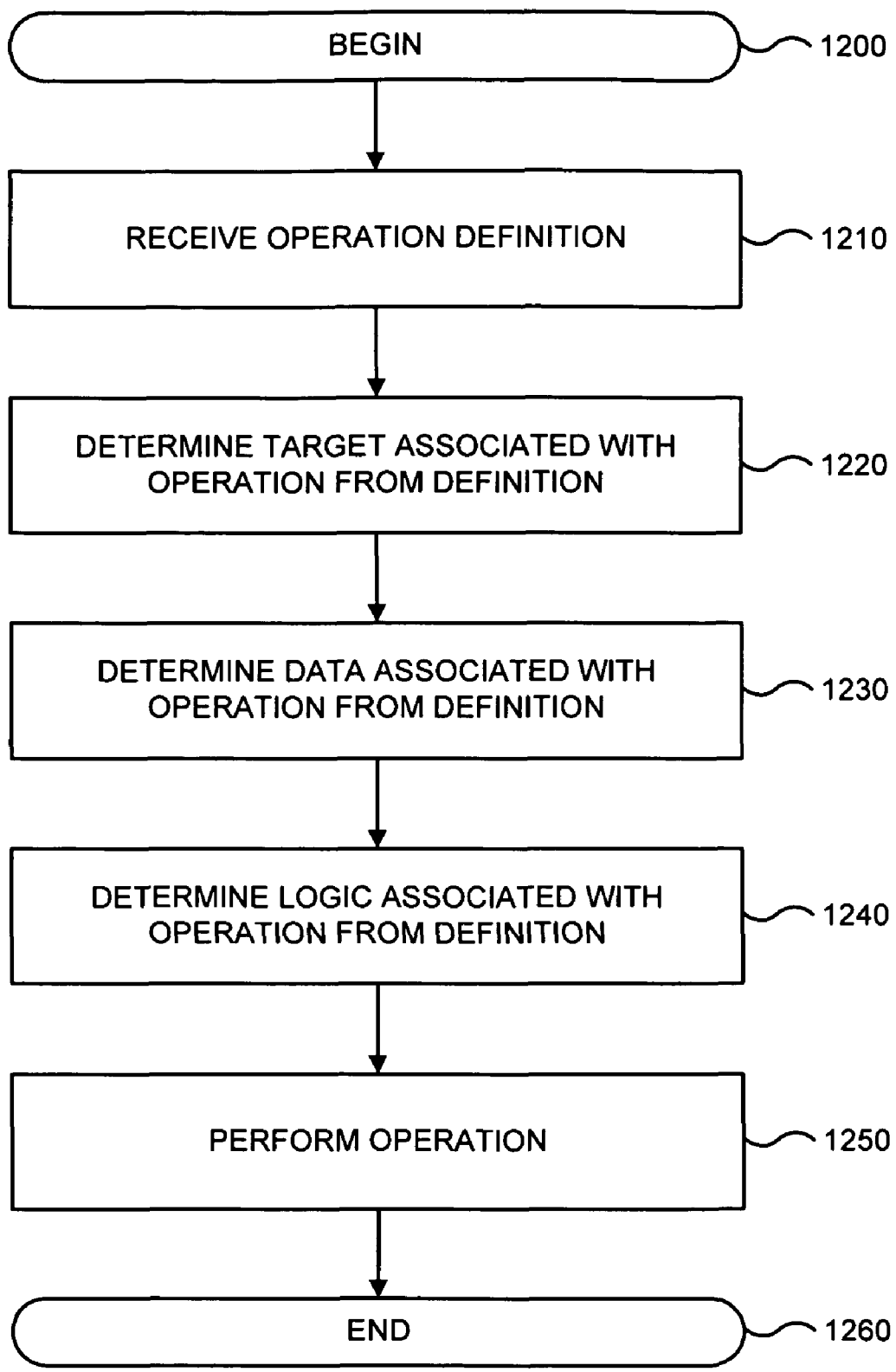
FIG. 12 is a flowchart of a method for performing a mass operation in one embodiment according to the present invention.

FIG. 12 is a flowchart of a method for performing a mass operation in one embodiment according to the present invention. FIG. 12 he did in step 1200.

In step 1210, a mass operation is received. For example, an administrator may upload a mass operation to a server functioning as a topology node or virtual node. In another example, a mass operation may be received at a child node from a parent node in the management hierarchy.

In step 1220, a target associated with the mass operation is determined. For example, a computer system that receives the mass operation determines whether the mass operation identifies a computer system as a target. In another example, the computer system is identified by a mass operation is a target, however the mass operation further identifies the computer system in a filter list excluding a computer system from executing the mass operation.

In step 1230, data associated with the mass operation is determined. In step 1240, logic associated with the management node is determined. In step 1250, the mass operation is performed at the target using the determined data and the determined logic. For example, a mass operation configured to remove a particular sensor device from every node in the management hierarchy may include data identifying the particular sensor device, and logic that automatically removes the particular sensor device from a given node. In another example, the mass network operation includes information that generates a user interface requesting one or more parameters from an administrator, review, and/or approval to complete the operation. FIG. 12 ends in step 1260.

Figure 13:
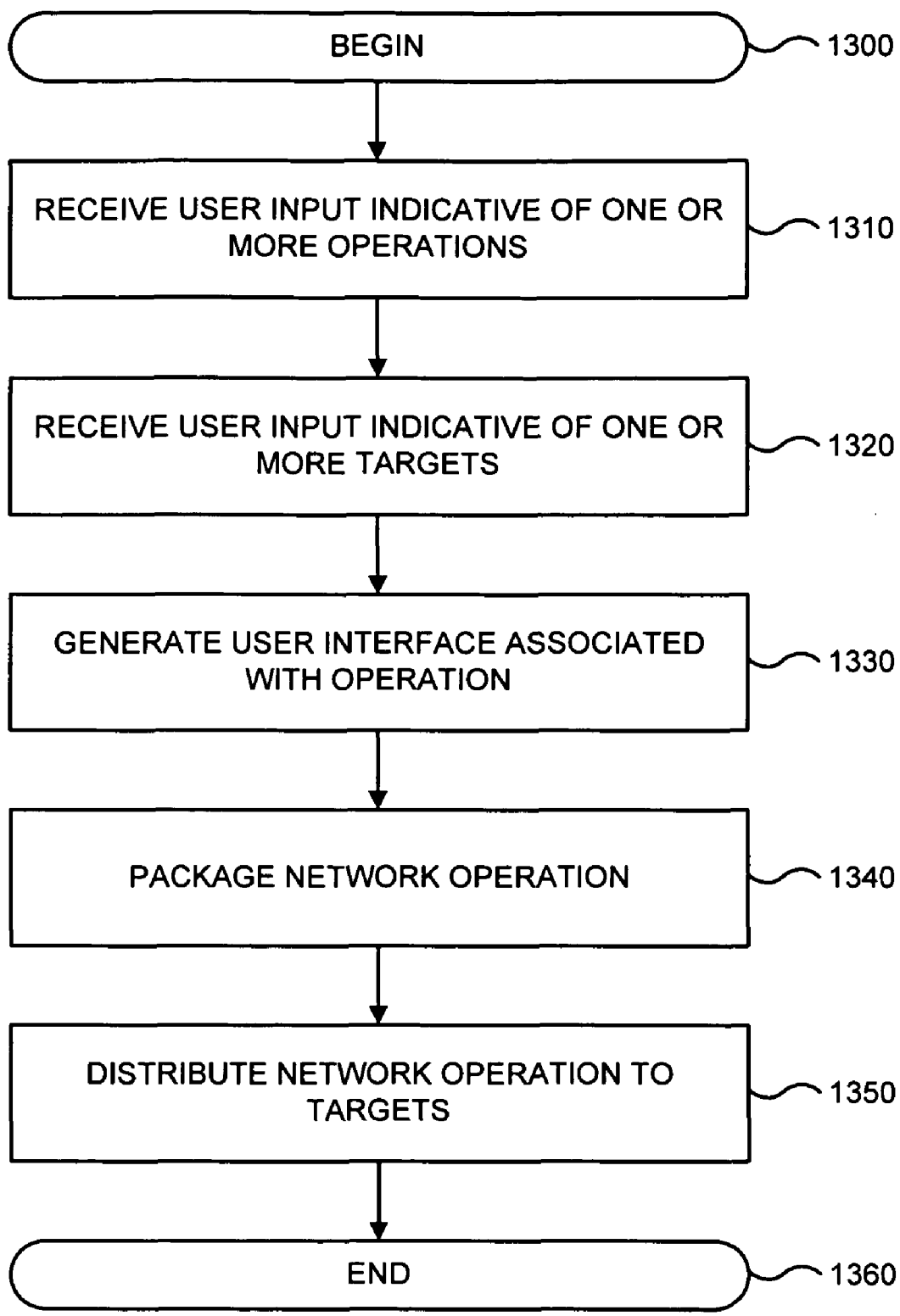
FIG. 13 is a flowchart of a method for generating a mass operation in one embodiment according to the present invention.

FIG. 13 is a flowchart of a method for generating a mass operation in one embodiment according to the present invention. FIG. 13 begins in step 1300.

In step 1310, user input is received indicative of one or more operations to be performed. Some examples of operations to be performed are adding a device, removing a device, adding a user, removing user, applying a policy, enforcing a policy, updating a security rule, reading data, storing data, and the like. One or more operations may be broken down into tasks and subtasks.

In step 1320, user input is received indicative of one or more targets. For example, the user input may specify a node in a management hierarchy by name or by another uniform resource indicator (URI). In another example, the user input may specify a group of nodes in the management hierarchy, such as "Warehouse #1." The user input may further specify that the mass operations to be cascaded to children and/or parents of a node.

In step 1330, a user interface associated with the mass operation is generated. For example, an administrator may create one or more Web forms which prompt for parameters needed to complete the operation, for review and/or approval, and the like. In step 1340, and mass operation is packaged. For example, an XML file defining the mass operation may be compressed in a zip file. In another example, a package management system may be used to create a distributable package of the definition file associated with the mass operation and any other files or dependencies needed to complete the mass operation.

In step 1350, and mass operation is distributed to the targets. For example, the zip file containing a compressed version of the XML file defining a mass operation may be uploaded to a node identified as a target. In another example, each node in the management hierarchy may poll a predetermined node configured to store packages associated with mass operations. Upon connecting to the predetermined node, each node in the management hierarchy may download new and/or updated packages that contain mass operations. FIG. 13 ends in step 1360.

Figure 14:
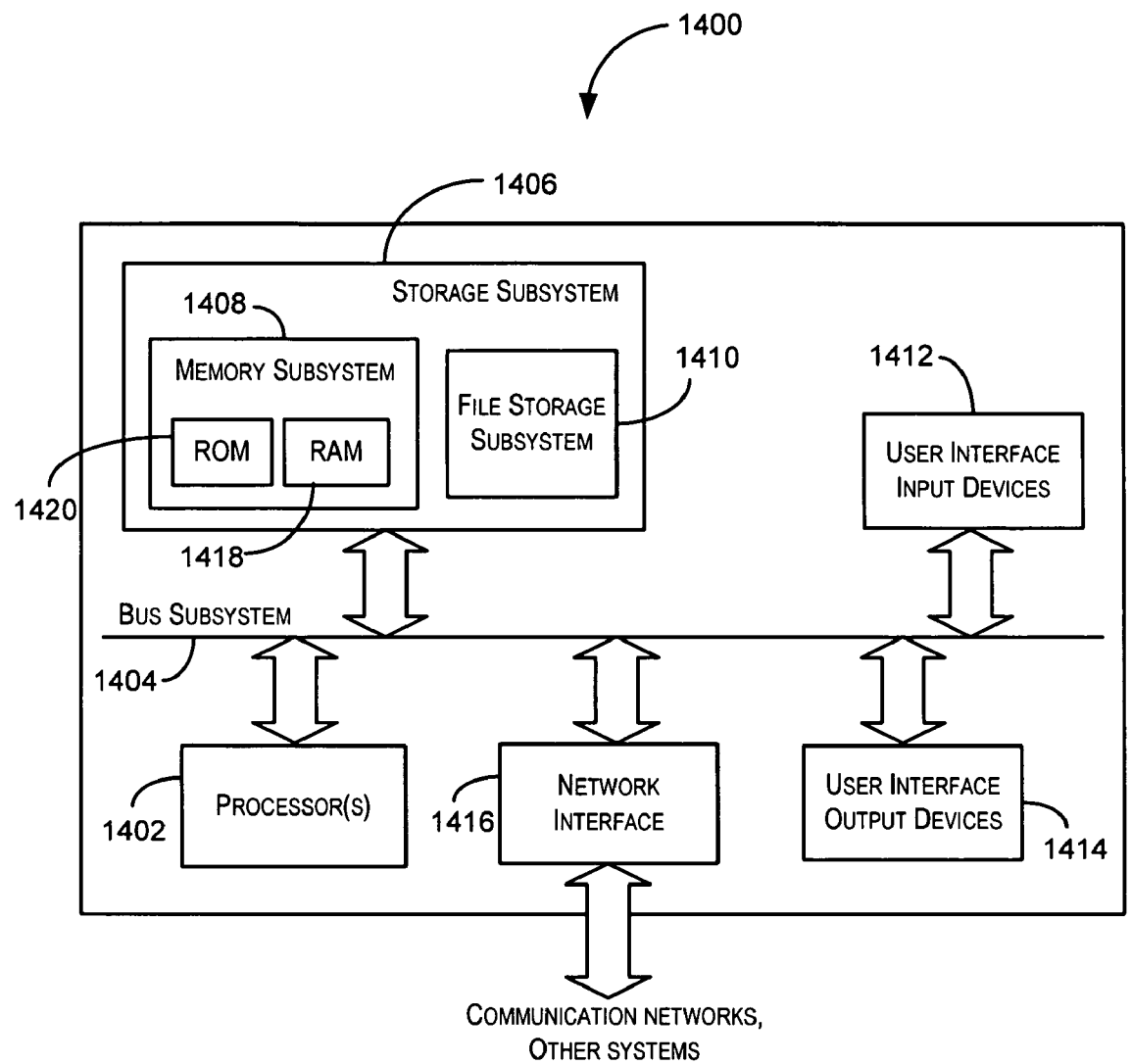
FIG. 14 is a simplified block diagram of a computer system that may be used to practice embodiments of the present invention.

FIG. 14 is a simplified block diagram of a computer system 1400 that may be used to practice embodiments of the present invention. As shown in FIG. 14, computer system 1400 includes a processor 1402 that communicates with a number of peripheral devices via a bus subsystem 1404. These peripheral devices may include a storage subsystem 1406, comprising a memory subsystem 1408 and a file storage subsystem 1410, user interface input devices 1412, user interface output devices 1414, and a network interface subsystem 1416.

Bus subsystem 1404 provides a mechanism for letting the various components and subsystems of computer system 1400 communicate with each other as intended. Although bus subsystem 1404 is shown schematically as a single bus, alternative embodiments of the bus subsystem may utilize multiple busses.

Network interface subsystem 1416 provides an interface to other computer systems, and networks, and devices. Network interface subsystem 1416 serves as an interface for receiving data from and transmitting data to other systems from computer system 1400.

User interface input devices 1412 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1400.

User interface output devices 1414 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1400.

Storage subsystem 1406 may be configured to store the basic programming and data constructs that provide the functionality of the present invention. Software (code modules or instructions) that provides the functionality of the present invention may be stored in storage subsystem 1406. These software modules or instructions may be executed by processor(s) 1402. Storage subsystem 1406 may also provide a repository for storing data used in accordance with the present invention. Storage subsystem 1406 may comprise memory subsystem 1408 and file/disk storage subsystem 1410.

Memory subsystem 1408 may include a number of memories including a main random access memory (RAM) 1418 for storage of instructions and data during program execution and a read only memory (ROM) 1420 in which fixed instructions are stored. File storage subsystem 1410 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Computer system 1400 can be of various types including a personal computer, a portable computer, a workstation, a network computer, a mainframe, a kiosk, or any other data processing system. Due to the ever-changing nature of computers and networks, the description of computer system 1400 depicted in FIG. 14 is intended only as a specific example for purposes of illustrating the preferred embodiment of the computer system. Many other configurations having more or fewer components than the system depicted in FIG. 14 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method for managing edge processors, the method comprising:
    receiving, at one or more computer systems, information defining a management hierarchy for the edge processors, the management hierarchy specifying a first device as a root node and at least one of the edge processors as a virtual node aggregating sensor data from a collection of physical sensor devices such that sensor data obtained from each physical sensor device in the collection of physical sensor devices is modified to appear to the first device as an upstream parent node of the virtual node in the management hierarchy to be originating from the virtual node;
    generating, with one or more processors associated with the one or more computer systems, information configured to display a graphical user interface enabling users of the graphical user interface to define network operations associated with at least one node in the management hierarchy;
    generating, with the one or more processors associated with the one or more computer systems, a network operation file based on input received via the graphical user interface, the network operation file being a text-based file specifying at least the virtual node in the management hierarchy and one or more actions to be performed with respect to the virtual node;
    communicating the network operation file from a third device configured as a direct upstream parent node of the virtual node in the management hierarchy to the at least one of the edge processors specified as the virtual node;
    receiving sensor data at the at least one of the edge processors specified as the virtual node from one or more physical sensor devices in the collection of physical sensor devices; and
    communicating the sensor data from the second device specified as the virtual node in the management hierarchy to the third device configured as a direct upstream parent node of the virtual node in the management hierarchy such that the sensor data is modified to appear to the third device to be originating from the virtual node.

2. The method of claim 1 further comprising:
    determining that one or more of the one or more actions in the network operation file pertain to at least one of the physical sensor devices in the collection of physical sensor devices; and
    transmitting at least a portion of the network operation file from the at least one of the edge processors specified as the virtual node in the management hierarchy directly to the at least one of the physical sensor devices in the collection of physical sensor devices.

3. The method of claim 1 further comprising:
    packaging the network operation file for distribution to the virtual node; and
    unpackaging the network operation file at the virtual node.

4. The method of claim 1 further comprising:
    receiving the network operation file at the at least one of the edge processors specified as the virtual node;
    instructing another edge processor to perform the action defined by the network operation file; and
    performing an action defined in the network operation file with the another edge processor.

5. The method of claim 1 further comprising:
    receiving a policy; and
    performing the action using the policy.

6. The method of claim 5 wherein the policy comprises access control information restricting access of a local administrator to one or more nodes in the management hierarchy; and
    performing an action defined in the network operation file using the policy.

7. A system for managing edge processors, the system comprising:
    a first set of one or more computer systems configured to:
        receive information defining a management hierarchy for the edge processors, the management hierarchy specifying a first device as a root node and at least one of the edge processors as a virtual node aggregating sensor data from a collection of physical sensor devices such that sensor data obtained from each physical sensor device in the collection of physical sensor devices is modified to appear to first device as an upstream parent node of the virtual node in the management hierarchy to be originating from the virtual node;
        generate information configured to display a graphical user interface enabling users of the graphical user interface to define network operations associated with at least one node in the management hierarchy;
        generate a network operation file based on input received via the graphical user interface, the network operation file being a text-based file specifying virtual node in the management hierarchy and one or more actions to be performed with respect to the virtual node; and
        cause the network operation file to be communicated from a third device configured as a direct upstream parent node of the virtual node in the management hierarchy to the at least one of the edge processors specified as the virtual node; and
    a second set of one or more computer systems configured to:
        receive sensor data at the at least one of the edge processors specified as the virtual node from one or more physical sensor devices in the collection of physical sensor devices; and
        communicate the sensor data from the second device specified as the virtual node in the management hierarchy to the third device configured as a direct upstream parent node of the virtual node in the management hierarchy such that the sensor data is modified to appear to the third device to be originating from the virtual node.

8. The system of claim 7 wherein the second set of one or more computer systems are further configured to:
    determine that one or more of the one or more actions in the network operation file pertain to at least one of the physical sensor devices in the collection of physical sensor devices; and
    transmit at least a portion of the network operation file from the at least one of the edge processors specified as the virtual node in the management hierarchy directly to the at least one of the physical sensor devices in the collection of physical sensor devices.

9. The system of claim 7 wherein the first set of one or more computer systems are further configured to:
- package the network operation file for distribution to the virtual node such that the network operation file is unpackaged at the virtual node.

10. The system of claim 7 wherein the second set of one or more computer systems are further configured to:
- receive the network operation file at the at least one of the edge processors specified as the virtual node;
- instruct another edge processor to perform the action defined by the network operation file; and
- perform an action defined in the network operation file with the at least one edge processor.

11. The system of claim 7 wherein the second set of one or more computer systems are further configured to:
- receive a policy; and
- perform the action using the policy.

12. The system of claim 11 wherein the policy comprises access control information; and
- wherein the second set of computer systems is configured to allow performance of an operation at an edge processor based on the access control information.

13. A non-transitory computer readable medium storing a set of code modules which when executed by a processor of computer system cause the processor to manage a plurality of edge processors, the non-transitory computer readable medium comprising:
- code for receiving information defining a management hierarchy for the edge processors, the management hierarchy specifying a first device as a root node and at least one of the edge processors as a virtual node aggregating sensor data from a collection of physical sensor devices such that sensor data obtained from each physical sensor device in the collection of physical sensor devices is modified to appear to the first device as an upstream parent node of the virtual node in the management hierarchy to be originating from the virtual node;
- code for generating information configured to display a graphical user interface enabling users of the graphical user interface to define network operations associated with at least one node in the management hierarchy;
- code for generating a network operation file based on input received via the graphical user interface, the network operation file being a text-based file specifying at least the virtual node in the management hierarchy and one or more actions to be performed with respect to the virtual node;
- code for communicating the network operation file from a third device configured as a direct upstream parent node of the virtual node in the management hierarchy to the at least one of the edge processors specified as the virtual node;
- code for receiving sensor data at the at least one of the edge processors specified as the virtual node from one or more physical sensor devices in the collection of physical sensor devices; and
- code for communicating the sensor data from the second device specified as the virtual node in the management hierarchy to the third device configured as a direct upstream parent node of the virtual node in the management hierarchy such that the sensor data is modified to appear to the third device to be originating from the virtual node.

14. The non-transitory computer readable medium of claim 13 further comprising:
- code for determining that one or more of the one or more actions in the network operation file pertain to at least one of the physical sensor devices in the collection of physical sensor devices; and
- code for transmitting at least a portion of the network operation file from the at least one of the edge processors specified as the virtual node in the management hierarchy directly to the at least one of the physical sensor devices in the collection of physical sensor devices.

15. The non-transitory computer readable medium of claim 13 further comprising:
- code for packaging the network operation file for distribution to the virtual node; and
- code for unpackaging the network operation file at the virtual node.

16. The non-transitory computer readable medium of claim 13 further comprising:
- code for receiving the network operation file at the at least one of the edge processors specified as the virtual node;
- code for instructing another edge processor to perform the action defined by the network operation file; and
- code for performing an action defined in the network operation file with the another edge processor.

17. The non-transitory computer readable medium of claim 13 further comprising:
- code for receiving a policy; and
- code for performing the action using the policy.

18. The non-transitory computer readable medium of claim 17 wherein the policy comprises access control information; and further comprising:
- code for allowing performance of an operation at an edge processor based on the access control information.

* * * * *

UNITED STATES PATENT AND TRADEMARK OFFICE
CERTIFICATE OF CORRECTION

PATENT NO. : 8,180,888 B2
APPLICATION NO. : 12/346648
DATED : May 15, 2012
INVENTOR(S) : Rehman et al.

Page 1 of 1

It is certified that error appears in the above-identified patent and that said Letters Patent is hereby corrected as shown below:

On the Title page, Item (75), under "Inventors", line 3, delete "Anit Chakroborthy" and insert -- Anit Chakraborthy --, therefor.

In column 9, line 1, delete ""MunicEdge1."" and insert -- "MunichEdge1." --, therefor.

In column 12, line 54, delete "he did" and insert -- begins --, therefor.

Signed and Sealed this
Thirty-first Day of July, 2012

David J. Kappos
*Director of the United States Patent and Trademark Office*